United States Patent
Lee

(10) Patent No.: US 10,315,071 B2
(45) Date of Patent: Jun. 11, 2019

(54) SYSTEM FOR PROVIDING PHYSICAL FITNESS INFORMATION

(71) Applicant: Bee Sin Lim, Melaka (MY)

(72) Inventor: Yang-Han Lee, New Taipei (TW)

(73) Assignee: Bee Sin Lim, Melaka (MY)

( * ) Notice: Subject to any disclaimer, the term of this patent is extended or adjusted under 35 U.S.C. 154(b) by 190 days.

(21) Appl. No.: 15/667,027

(22) Filed: Aug. 2, 2017

(65) Prior Publication Data

US 2018/0193695 A1 Jul. 12, 2018

(30) Foreign Application Priority Data

Jan. 12, 2017 (TW) .................................. 106100936

(51) Int. Cl.
*A63B 24/00* (2006.01)
*A63B 21/06* (2006.01)
(Continued)

(52) U.S. Cl.
CPC .......... *A63B 24/0062* (2013.01); *A63B 21/06* (2013.01); *A63B 71/0619* (2013.01); *A63B 22/0076* (2013.01); *A63B 22/02* (2013.01); *A63B 22/0605* (2013.01); *A63B 22/0664* (2013.01); *A63B 2024/0065* (2013.01); *A63B 2220/17* (2013.01); *A63B 2220/20* (2013.01); *A63B 2220/30* (2013.01);
(Continued)

(58) Field of Classification Search
CPC . A63B 22/02; A63B 22/0605; A63B 22/0664; A63B 2220/17; A63B 2220/20; A63B 2225/20; A63B 2225/50; A63B 2230/06; A63B 2230/30; A63B 2230/50; A63B 2230/70; A63B 2220/30; A63B 21/06; A63B 71/0619; A63B 2024/0065; A63B 24/0062; H04W 4/80

USPC ........................................................ 455/41.2
See application file for complete search history.

(56) References Cited

U.S. PATENT DOCUMENTS

2016/0107029 A1* 4/2016 Kim ...................... A61B 5/6895
 482/8
2017/0262589 A1* 9/2017 Ortiz ..................... G06F 19/325

FOREIGN PATENT DOCUMENTS

TW        M450170 U1     4/2013
TW        201349781 A   12/2013
(Continued)

OTHER PUBLICATIONS

Search Report appended to an Office Action, which was issued to Taiwanese counterpart application No. 106100936 by the TIPO dated Aug. 7, 2018, with an English translation thereof.

*Primary Examiner* — Lee Nguyen
(74) *Attorney, Agent, or Firm* — Trop Pruner & Hu, P.C.

(57) ABSTRACT

A system includes a physical fitness equipment, a wearable Bluetooth device, a Bluetooth gateway and a remote server. The physical fitness equipment capable of Bluetooth communication transmits physical fitness message. The wearable Bluetooth device paired with a mobile device transmits a user message related to a network address of the mobile device. The Bluetooth gateway receives the physical fitness message from the physical fitness equipment paired therewith, receives the user message from the wearable Bluetooth device closest thereto, and transmits a data packet including the aforementioned two messages to the remote server, which subsequently relays the physical fitness data included in the data packet to the mobile device.

20 Claims, 4 Drawing Sheets

(51) Int. Cl.
*A63B 71/06* (2006.01)
*A63B 25/00* (2006.01)
*A63B 22/02* (2006.01)
*A63B 22/06* (2006.01)
*A63B 22/00* (2006.01)
*H04W 4/80* (2018.01)

(52) U.S. Cl.
CPC ....... *A63B 2225/20* (2013.01); *A63B 2225/50* (2013.01); *A63B 2230/06* (2013.01); *A63B 2230/30* (2013.01); *A63B 2230/50* (2013.01); *A63B 2230/70* (2013.01); *H04W 4/80* (2018.02)

(56) References Cited

FOREIGN PATENT DOCUMENTS

| | | |
|---|---|---|
| TW | 201616824 A | 5/2016 |
| TW | 201618019 A | 5/2016 |

\* cited by examiner

SYSTEM FOR PROVIDING PHYSICAL FITNESS INFORMATION

CROSS-REFERENCE TO RELATED APPLICATION

This application claims priority of Taiwanese Patent Application No. 106100936, filed on Jan. 12, 2017.

FIELD

The disclosure relates to a system for providing information, and more particularly to a system for providing physical fitness information to a mobile device.

BACKGROUND

Referring to a Bluetooth transmission system disclosed in U.S. Patent Application Publication No. 2015/0350819 as shown in FIG. 1, the Bluetooth transmission system 1 includes a monitoring device 11 and a mobile communication device 12 that are communicable with each other by Bluetooth Low Energy (BLE) techniques. The Bluetooth transmission system 1 further includes a cloud management platform 13. The monitoring device 11 produces a physiological signal (i.e., a biosignal) in response to detection of a bio indicator so as to generate a data packet that includes the physiological signal and an identification code (i.e., a universally unique identifier, UUID) corresponding to the monitoring device 11. When receiving the data packet, the mobile communication device 12 decodes the data packet automatically by referring to a comparison table, so as to obtain the physiological signal and the identification code, and stores toe physiological signal and the identification code in the cloud management platform 13. According to the identification code thus stored, the mobile communication device 12 is capable of determining the monitoring device 11 to be the one that produces the physiological signal. The Bluetooth transmission system 1 directly facilitates communication of the mobile communication device 12 with several monitoring devices 11, allegedly without the devices performing a conventional "Search-Pair-Connect" manual operating procedure.

However, obtaining and storing the comparison table, and decoding the data packet by referring to the comparison table may be more complicated and time-consuming than the manual operating procedure for communication establishment. In addition, the Bluetooth transmission system 1 is unable to distinguish users of mobile communication devices and the data packet has to be broadcasted to all users merely for communicating with one of the users, creating concern over privacy. Moreover, the physiological signal from the monitoring device 11 has no chance of being obtained by the mobile communication device 12 when the mobile communication device 12 cannot be brought nearby the monitoring device 11 (e.g., in view of certain rule or regulation imposed on a specific environment).

SUMMARY

Therefore, an object of the disclosure is to provide a system for providing physical fitness information to a mobile device that can alleviate at least one of the drawbacks of the prior art.

According to the disclosure, the system includes a physical fitness equipment, a wearable Bluetooth device, a Bluetooth gateway and a remote server.

The physical fitness equipment is provided with Bluetooth communication capability, and is configured to generate a physical fitness data based on measurement of physical fitness of a user, and to transmit physical fitness message that includes the physical fitness data thus generated, a physical fitness date on which the physical fitness data is generated, and a physical fitness time of day at which the physical fitness data is generated.

The wearable Bluetooth device is to be worn on the user, and is configured to be paired with the mobile device to obtain a description code associated with a network address of the mobile device, and to transmit a user message which includes the description code.

The Bluetooth gateway is capable of being paired with the physical fitness equipment so as to receive the physical fitness message therefrom when disposed near the physical fitness equipment. The Bluetooth gateway is configured to select the wearable Bluetooth device that is closer to the Bluetooth gateway than other wearable Bluetooth devices for communication therewith, so as to receive the user message therefrom, and is configured to transmit a data packet that includes the physical fitness message and the user message.

The remote server is configured to receive the data packet from the Bluetooth gateway via a network, and to transmit, according to the data packet thus received, the physical fitness data, the physical fitness date and the physical fitness time of day to the mobile device the network address of which is indicated by the description code.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
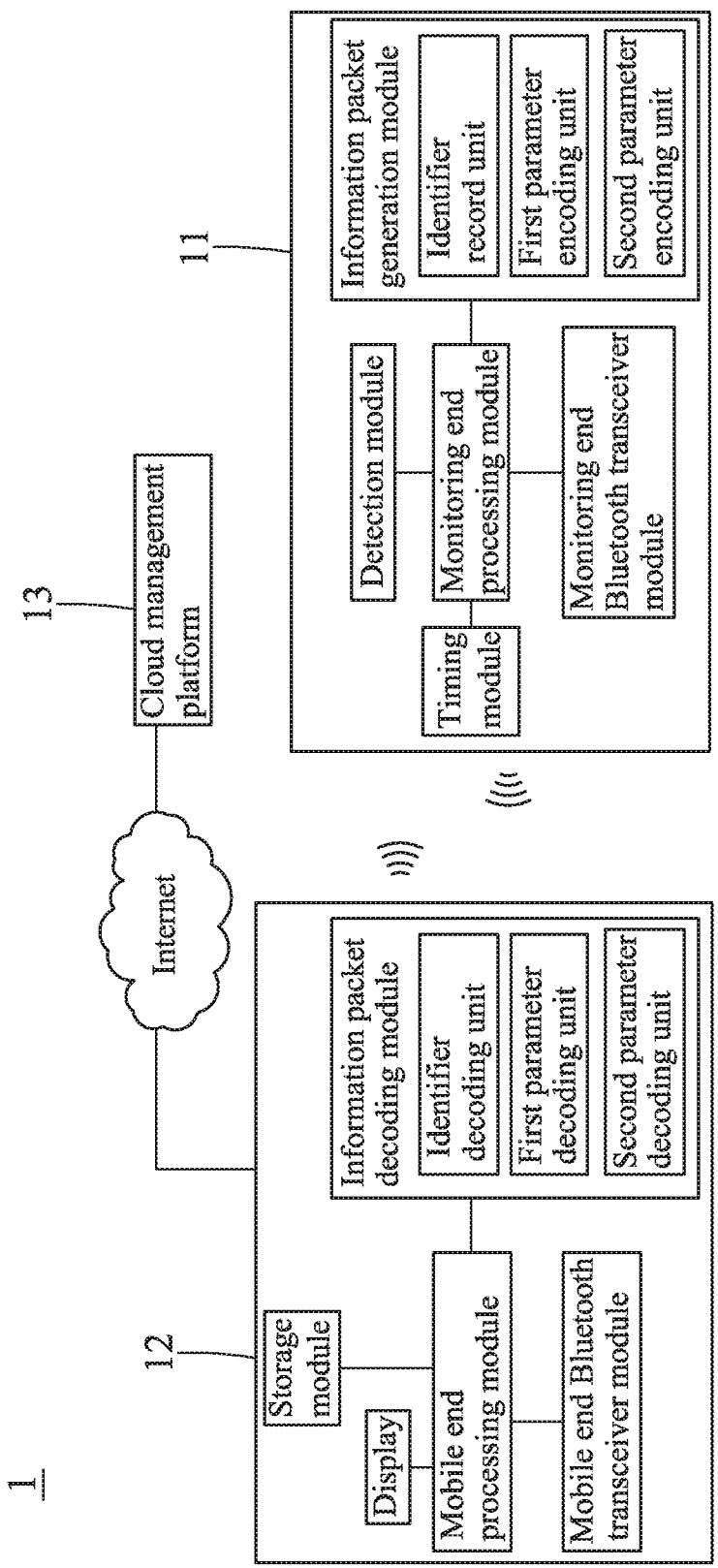
FIG. 1 is a block diagram illustrating a Bluetooth transmission system disclosed in U.S. Patent Application Publication No. 2015/0350819.
Figure 2:
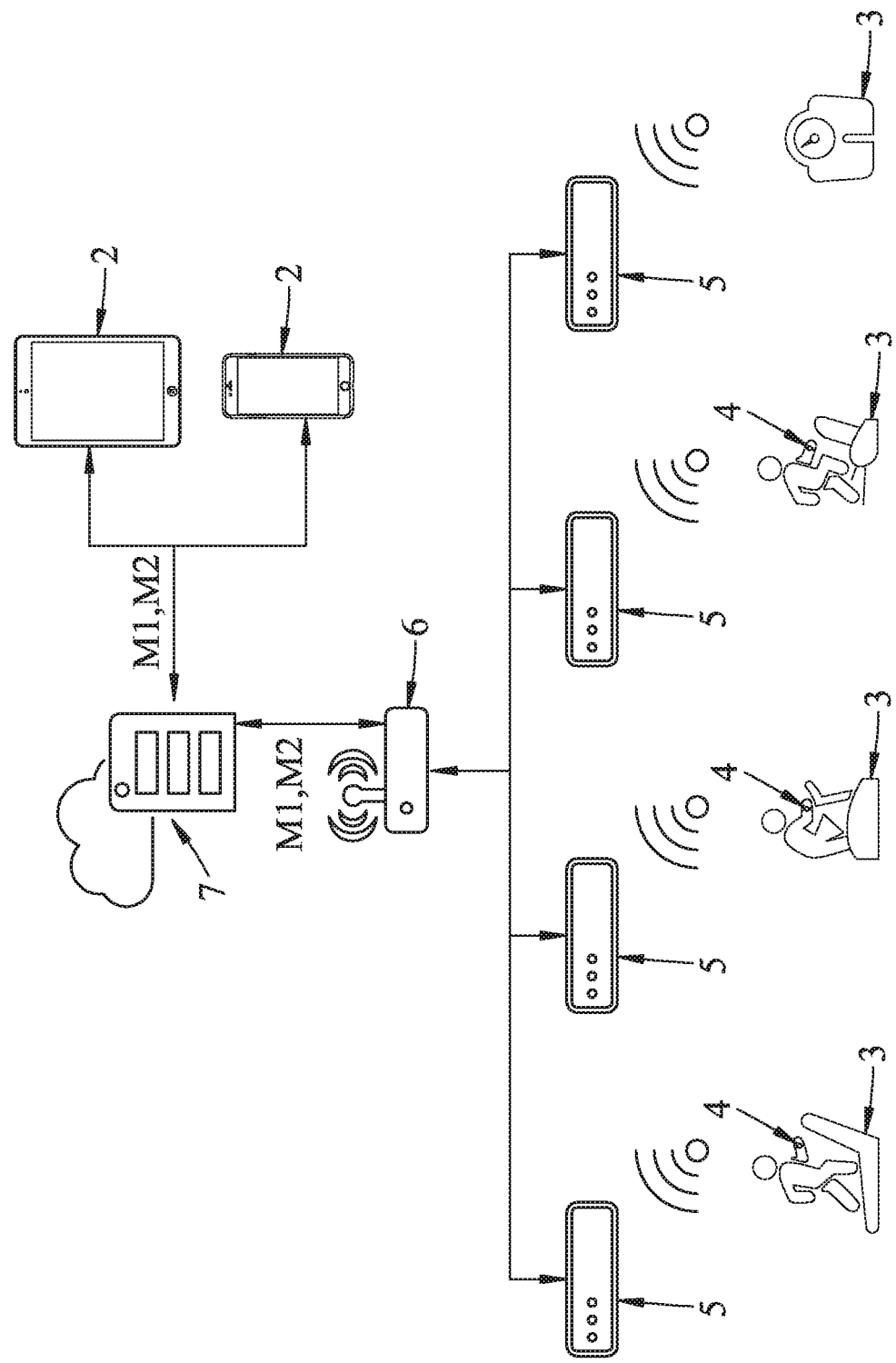
FIG. 2 is a schematic diagram illustrating an embodiment of a system for providing physical fitness information according to the disclosure.
Figure 3:
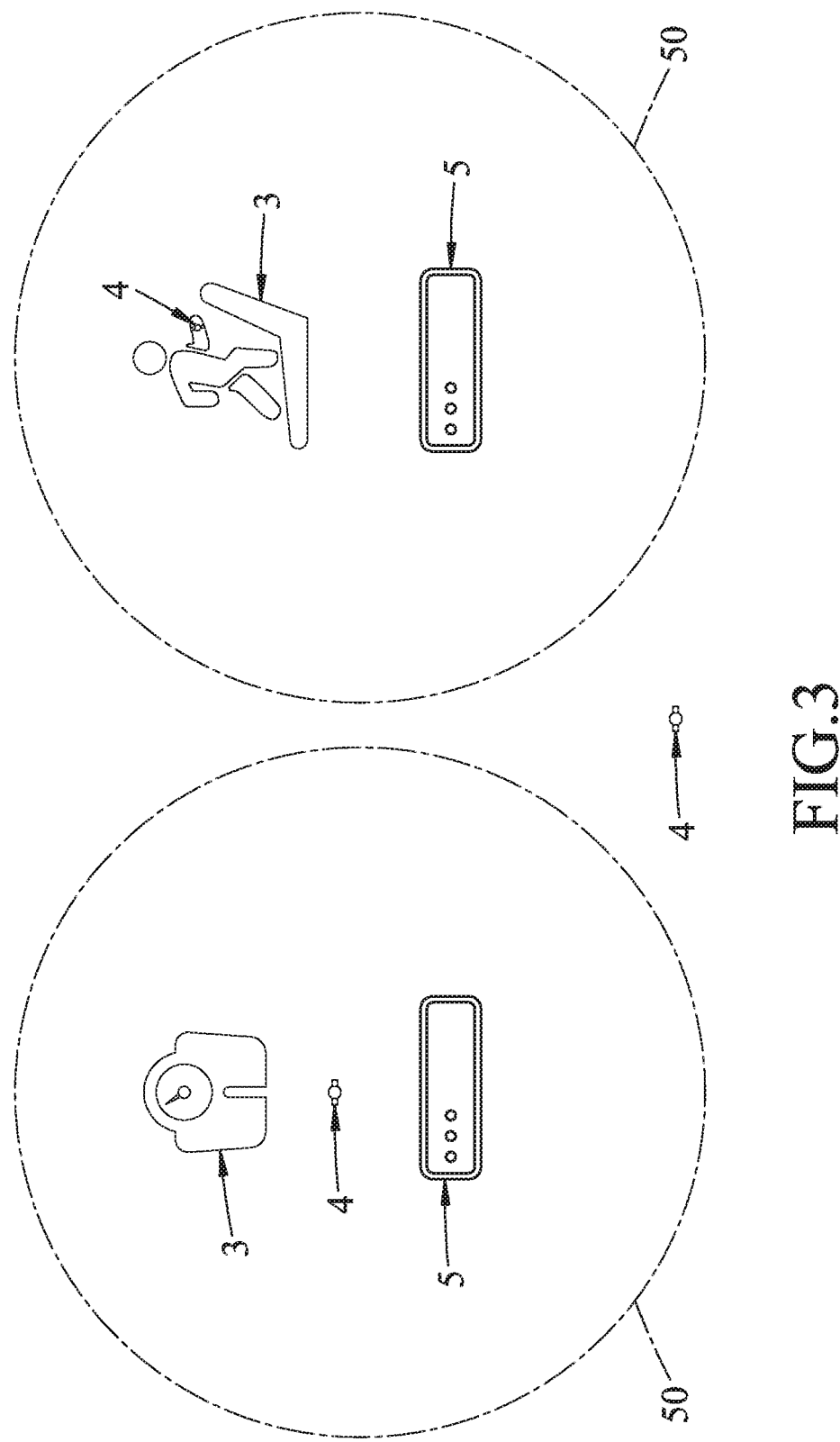
FIG. 3 is a schematic diagram illustrating an embodiment of near field ranges defined by Bluetooth gateways of the system of this disclosure.
Figure 4:
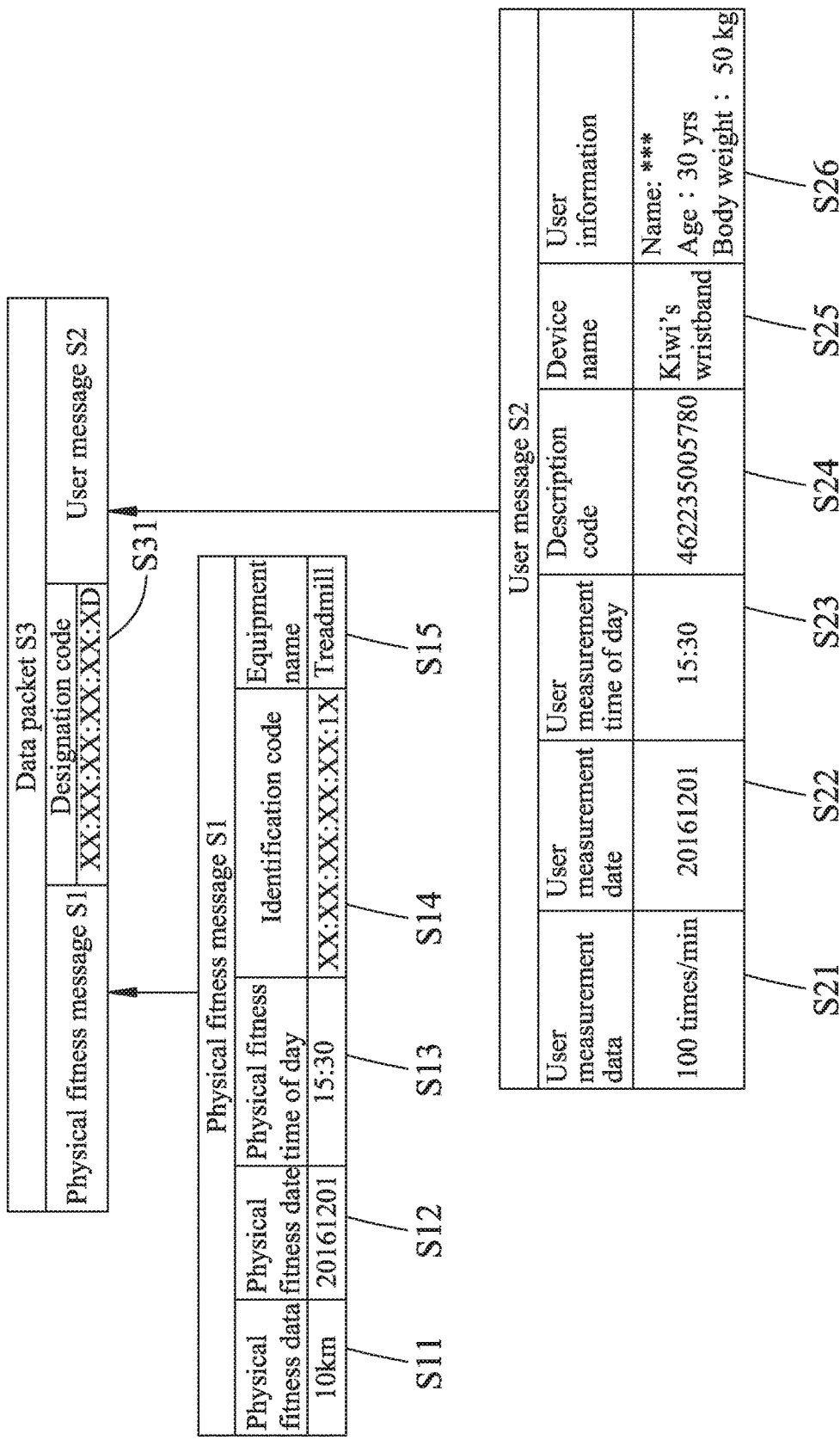
FIG. 4 is a schematic diagram illustrating an embodiment of a data packet generated by the system of this disclosure.

Referring to FIGS. 2 to 4, an embodiment of a system for providing physical fitness information to a mobile device 2 is illustrated. The mobile device 2 may be a mobile phone or a tablet computer, but is not limited thereto. The system includes plural physical fitness equipments 3, plural wearable Bluetooth devices 4, plural Bluetooth gateways 5, a wireless router n and a remote server 7.

Each of the physical fitness equipments 3 is provided with Bluetooth communication capability and is disposed at a fixed location. In this embodiment, each of the physical fitness equipments 3 may be implemented to include at least one of a weight scale, a blood pressure gauge, a treadmill, an elliptical trainer, a stationary bicycle, a rowing machine or a weight lifting machine, but is not limited thereto. Each of the physical fitness equipments 3 is configured to generate physical fitness data (S11) based on measurement of physical fitness of a user thereof, and to transmit physical fitness message (S1) that includes the physical fitness data (S11) thus generated, a physical fitness date (S12) on which the physical fitness data (S11) is generated, a physical fitness time of day (S13) at which the physical fitness data (S11) is generated, an identification code (S14) associated with identification of the physical fitness equipment 3, and an equipment name (S15) corresponding to the identification code (S14). In this embodiment, the physical fitness data (S11) may be implemented to be associated with at least one of body weight, blood pressure, a body temperature, a body fat percentage (BFP), an amount of consumed energy, a step count, a distance of movement, a lifted weight, a moving velocity, or a count of movement of the user, but is not limited thereto. In this embodiment, the identification code (S14) is implemented by a Media Access Control (MAC) Address, but implementation of the identification code (S14) may vary in other embodiments, and is not limited thereto.

One of the wearable Bluetooth devices 4 is to be worn on the user. Said one of the wearable Bluetooth devices 4 is configured to generate user measurement data (S21) according to a physiological condition of the user. The user measurement data (S21) may be associated with at least one of a heart rate, a body temperature, an amount of consumed energy, a step count, a distance of movement, a moving velocity, or a count of movement of the user, but is not limited thereto. Each of the wearable Bluetooth devices 4 is configured to be paired with the mobile device 2 by a Bluetooth Low Energy (BLE) technique to obtain a description code (S24) associated with a network address of the mobile device 2. Said one of the wearable Bluetooth devices 4 is configured to transmit a user message (S2) that includes the user measurement data (S21), a user measurement date (S22) on which the user measurement data (S21) is generated, a user measurement time of day (S23) at which the user measurement data (S21) is generated, the description code (S24), a device name (S25) corresponding to said one of the wearable Bluetooth devices 4, and user information (S26) associated with personal information of the user (e.g., user's name, age, body weight, and so on).

In this embodiment, each of the wearable Bluetooth devices 4 may be implemented to include a smart wristband with heart rate detection function, but is not limited thereto. Specifically speaking, each of the wearable Bluetooth devices 4 transmits, based on a setting thereof that may be set by the mobile device 2 or be a default factory setting, the user message (S2) including the user measurement data (S21) which is associated with a heart rate detected thereby whenever the detected heart rate is greater than a predetermined heart rate (e.g., when the user is doing exercise). However, implementation of transmitting the user message (S2) may vary in other embodiments, and is not limited to the disclosure herein. In one embodiment, each of the wearable Bluetooth devices 4 may transmit the user message (S2) at predefined time intervals of a first length.

Each of the Bluetooth gateways 5 is capable of being paired with any one of the physical fitness equipments 3 so as to receive, when disposed near one of the physical fitness equipments 3, the physical fitness message (S1) therefrom. Additionally, each of the Bluetooth gateways 5 is configured to determine, based on Received Signal Strength Indicator (RSSI) information received from one of the wearable Bluetooth devices 4, a distance between said one of the wearable Bluetooth devices 4 and the Bluetooth gateway 5. Each of the Bluetooth gateways 5 defines a near field range 50 as shown in FIG. 3, and is configured to request, at the predefined time intervals of the first length, one of the wearable Bluetooth devices 4 to transmit the user message (S2) when it is determined by the Bluetooth gateway 5 according to the RSSI information that said one of the wearable Bluetooth devices 4 is within the near field range 50. Moreover, each of the Bluetooth gateways 5 is configured to select one of the wearable Bluetooth devices 4 that is closer to the Bluetooth gateway 5 than all other wearable Bluetooth devices 4 of the system for communication therewith (i.e., closest to the Bluetooth gateway 5 among all the wearable Bluetooth devices 4 of the system, so as to receive the user message (S2) from said selected one of the wearable Bluetooth devices 4. Each of the Bluetooth gateways 5 is configured to transmit a data packet (S3) that includes the physical fitness message (S1), the user message (S2), and a designation code (S31). In this embodiment, the designation code (S31) is implemented by a MAC address.

It should be noted that the identification code (S14) of one of the physical fitness equipments 3 may be encoded into a barcode, a matrix barcode like QR code, or the like. Under such configuration, each of the Bluetooth gateways 5 is configured to scan the barcode via a scanner (not shown) and to decode the barcode so as to obtain the identification code (S14), and is to be paired with the selected one of the physical fitness equipments 3 based on the identification code (S14) thereof.

The wireless router 6 is configured to communicate with the Bluetooth gateways 5 and the remote server 7 via at least one network, and to receive the data packet (S3) from any one of the Bluetooth gateways 5.

The remote server 7 is configured to communicate with the mobile device 2 and the wireless router 6 via at least one network, and to receive the data packet (S3) from any one of the Bluetooth gateways 5 via the wireless router 6. The remote server 7 stores in advance a location mapping table which maps the identification code (S14) of one of the physical fitness equipments 3 to the fixed location where said one of the physical fitness equipments 3 is disposed (e.g., in a specific fitness center). Therefore, the remote server 7 is configured to determine the fixed location based on the identification code (S14) included in the data packet (S3) and the location mapping table. Furthermore, the remote server 7 is configured to determine a current location of said one of the wearable Bluetooth devices 4 based on the fixed location. The remote server 7 is further configured to transmit, according to the data packet (S3) thus received, information of the fixed location to the mobile device 2, the network address of which is indicated by the description code (S24) contained in the data packet (S3), so as to enable the user of the mobile device 2 to acquire, via the mobile device 2, the information regarding a location where the physical fitness message (S1) is generated.

It is worth noting that the mobile device 2 executes an application program obtained from the remote server 7 to provide a user interface for the user to register an account, to create a password, to set up permission of the application program for accessing functions of the mobile device 2, and to assign the device name (S25) corresponding to one of the wearable Bluetooth devices 4 depending on the user's personal preference. Said one of the wearable Bluetooth devices 4 is configured to obtain the device name (S25) from the mobile device 2 through paring with the mobile device 2. In addition, the mobile device 2 executing the application program is operable to create a conversion table that records a relationship between the equipment name (S15) corresponding to one of the physical fitness equipments 3 and a designated name preferred by the user. The equipment name (S15), when being received by the mobile device 2 via the application program, enables the mobile device 2 to convert the equipment name (S15) into the designated name based on the conversion table for display of the designated name by the mobile device 2.

In some embodiments, each of those physical fitness equipments 3 which are to be operated by users continuously for an extended period of time (e.g., a treadmill or an elliptical trainer) is configured to continuously update the physical fitness data (S11) based on latest measurement of the physical fitness of the user, and transmit the physical fitness message (S1) that includes the physical fitness data (S11) thus updated. Each of the Bluetooth gateways 5 that is paired with one of the physical fitness equipments 3 is configured to receive the physical fitness message (S1) which includes the physical fitness data (S11) thus updated therefrom. At the same time, for each of the Bluetooth gateways 5, whenever it is determined by the Bluetooth gateway 5 according to the RSSI information that one of the wearable Bluetooth devices 4 is within the near field range 50, the Bluetooth gateway 5 is configured to request, at the predefined time intervals of the first length, e.g., every five seconds to every five minutes, said one of the wearable Bluetooth devices 4 to transmit the user message (S2). Consequently, the aforementioned Bluetooth gateway 5 is configured to receive the user message (S2) thus transmitted at the predefined time intervals of the first length. Thereafter, the aforementioned Bluetooth gateway 3 is configured to be triggered to transmit, at predetermined time intervals of a second length, e.g., every five seconds to every five minutes, to the wireless router 6, the data packet (S3) which includes the physical fitness message (S1) received from said one of the physical fitness equipments 3 and the user message (S2) received from said one of the wearable Bluetooth devices 4, for the wireless router 6 to transmit the data packet (S3) to the remote server 7 via the Internet in some embodiments, each of those physical fitness equipments 3 which only measure physical fitness once for each operation (e.g., a weight scale or a blood pressure gauge) is configured to update the physical fitness data (S11) once based on latest measurement of the physical fitness of the user, and simultaneously transmit the physical fitness message (S1) that includes the physical fitness data (S11) thus updated. Each of the Bluetooth gateways 5 that is paired with one of the physical fitness equipments 3 is configured to receive therefrom the physical fitness message (S1) which includes the physical fitness data (S11) thus updated, and to transmit, each time when receiving the physical fitness message (S1) that includes the physical fitness data (S11) thus updated therefrom, the data packet (S3) that includes the physical fitness message (S1) thus received.

After receiving the data packet (S3), the remote server 7 is configured to look up the location mapping table according to the identification code (S14) included in the data packet (S3) and to determine the fixed location where a corresponding one of the physical fitness equipments 3 is disposed. Furthermore, the remote server 7 is configured to determine the current location of said one of the wearable Bluetooth devices 4 based on the fixed location.

Moreover, the remote server 7 is further configured to transmit, according to the description code (S24) included in the data packet (S3) thus received, the physical fitness data (S11), the physical fitness date (S12), the physical fitness time of day (S13), the equipment name (S15), the user measurement data (S21), the user measurement date (S22), the user measurement time of day (S23) and the device name (S25) to the mobile device 2 the network address of which is indicated by the description code (S24), so as to enable the user of the mobile device 2 to acquire the aforementioned information (i.e., the physical fitness information) via the mobile device 2.

It should be noted that, each of the physical fitness equipments 3 is configured to store the physical fitness message (S1) for later transmitting the physical fitness message (S1) to one of the Bluetooth gateways 5 when communication therewith is available, and for recording the physical fitness message (S1) when communication with said one of the Bluetooth gateways 5 is unavailable. Additionally, each of the wearable Bluetooth devices 4 is configured to store the user message (S2) for later transmitting the user message (S2) to one of the Bluetooth gateways 5 when communication therewith is available, and for recording the user message (S2) when communication with said one of the Bluetooth gateways 5 is unavailable. Similarly, each of the Bluetooth gateways 5 is configured to store the physical fitness message (S1) and the user message (S2) for later transmitting the data packet (S3) that includes the physical fitness message (S1) and the user message (S2) thus stored to the remote server 7 when communication therewith is available, and for recording the physical fitness message (S1) and the user message (S2) in the data packet (S3) when communication with the remote server 7 is unavailable.

In some embodiments, the remote server 7 is further configured to transmit a first push message (M1) to the mobile device 2 according to a preset date (D), so as to remind the user to exercise, and to transmit a second push message (M2) to the mobile device 2 according to a preset duration ranging from five minutes to three hundred minutes, so as to remind the user that elapsed time of continuous operation of one of the physical fitness equipments 3 has reached the preset duration. Further, one of the wearable Bluetooth devices 4 is configured to receive the first push message (141) and the second push message (M2) that are transmitted from the mobile device 2 when said one of the wearable Bluetooth devices 4 is within a communicable range of the mobile device 2 by Bluetooth. Therefore, the user may be well informed by the first push message (M1) and the second push message (M2) via either the mobile device 2 or the wearable Bluetooth device 4.

In some embodiments, after being paired with one of the physical fitness equipments 3, each of the Bluetooth gateways 5 is configured to transmit, based on the user message (S2), the user information (S26) to said one of the physical fitness equipments 3 paired therewith to enable said one of the physical fitness equipments 3 to display the user information (S26).

In summary, by virtue of paring between the Bluetooth gateway 5 and the physical fitness equipment 3, by virtue of the wearable Bluetooth device 4 which has been paired with the mobile device 2 so as to obtain the description code S24 indicating the network address of the mobile device 2, and by virtue of data communication between the Bluetooth gateway 5 and the wearable Bluetooth device 4, the system of this disclosure is capable of facilitating transmission of physical fitness information which is collected from the physical fitness equipment 3 and/or the wearable Bluetooth device U to the mobile device 2 which is not within a communicable range of the physical fitness equipment 3 and/or the wearable Bluetooth device U, without manual operation by the user. Moreover, the system of this disclosure enables the physical fitness equipment 3 to automatically display thereon the personal information of the user stored in the wearable Bluetooth device 4 without user's manual input of the personal information into the physical fitness equipment 3.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for providing physical fitness information to a mobile device, said system comprising:
   a physical fitness equipment which is provided with Bluetooth communication capability, and which is configured to generate physical fitness data based on measurement of physical fitness of a user, and to transmit physical fitness message that includes the physical fitness data thus generated, a physical fitness date on which the physical fitness data is generated, and a physical fitness time of day at which the physical fitness data is generated;
   a wearable Bluetooth device which is to be worn on the user, and which is configured to be paired with the mobile device to obtain a description code associated with a network address of the mobile device, and to transmit a user message that includes the description code;
   a Bluetooth gateway which is capable of being paired with said physical fitness equipment so as to receive the physical fitness message therefrom when disposed near said physical fitness equipment, which is configured to select said wearable Bluetooth device that is closer to said Bluetooth gateway than other wearable Bluetooth devices for communication therewith, so as to receive the user message from said wearable Bluetooth device, and which is configured to transmit a data packet that includes the physical fitness message and the user message; and
   a remote server which is configured to receive the data packet from said Bluetooth gateway via a network, and to transmit, according to the data packet thus received, the physical fitness data, the physical fitness date and the physical fitness time of day to the mobile device the network address of which is indicated by the description code.

2. The system as claimed in claim 1, wherein:
   the physical fitness message further includes an identification code associated with identification of said physical fitness equipment, and an equipment name corresponding to the identification code; and
   said remote server is further configured to transmit, according to the data packet thus received, the equipment name to the mobile device corresponding to the description code.

3. The system as claimed in claim 2, the mobile device executing an application program to create a conversion table that records a relationship between the equipment name and a designated name, wherein:
   when received by the mobile device via the application program, the equipment name enables the mobile device to convert the equipment name into the designated name based on the conversion table for display of the designated name by the mobile device.

4. The system as claimed in claim 1, wherein:
   said wearable Bluetooth device is configured to generate user measurement data according to a physiological condition of the user;
   the user message further includes the user measurement data, a user measurement date on which the user measurement data is generated, and a user measurement time of day at which the user measurement data is generated; and
   said remote server is further configured to transmit, according to the data packet thus received, the user measurement data, the user measurement date and the user measurement time of day to the mobile device corresponding to the description code.

5. The system as claimed in claim 4, wherein the user measurement data is associated with at least one of a heart rate, a body temperature, an amount of consumed energy, a step count, a distance of movement, a moving velocity, or a count of movement of the user.

6. The system as claimed in claim 1, wherein:
   the user message further includes a device name corresponding to the wearable Bluetooth device; and
   said remote server is further configured to transmit, according to the data packet thus received, the device name to the mobile device corresponding to the description code.

7. The system as claimed in claim 6, the mobile device executing an application program to assign the device name to said wearable Bluetooth device, wherein
   said wearable Bluetooth device is further configured to obtain the device name from the mobile device through paring with the mobile device.

8. The system as claimed in claim 1, wherein:
   the physical fitness message further includes an identification code associated with identification of said physical fitness equipment;
   the identification code of said physical fitness equipment is encoded into a barcode; and
   said Bluetooth gateway is configured to scan the barcode and to decode the barcode so as to obtain the identification code, and is to be paired with said physical fitness equipment based on the identification code.

9. The system as claimed in claim 1, wherein:
   said physical fitness equipment is configured to update the physical fitness data based on latest measurement of the physical fitness of the user and to transmit the physical fitness message that includes the physical fitness data thus updated; and
   said Bluetooth gateway paired with said physical fitness equipment is configured to transmit, each time when receiving the physical fitness message that includes the physical fitness data thus updated from said physical fitness equipment, the data packet that includes the physical fitness message thus received.

10. The system as claimed in claim 1, wherein:
    said physical fitness equipment is configured to update the physical fitness data based on latest measurement of the physical fitness of the user and to transmit the physical fitness message that includes the physical fitness data thus updated; and said Bluetooth gateway paired with said physical fitness equipment is configured to receive the physical fitness message that includes the physical fitness data thus updated from said physical fitness equipment, and to transmit the data packet that includes the physical fitness message thus received at predetermined time intervals.

11. The system as claimed in claim 1, wherein said Bluetooth gateway is configured to determine a distance between said wearable Bluetooth device and said Bluetooth gateway based on Received Signal Strength Indicator (RSSI) information received from said wearable Bluetooth device.

12. The system as claimed in claim 11, wherein said Bluetooth gateway defines a near field range, and is configured to request, at predefined time intervals, said wearable Bluetooth device to transmit the user message when it is determined by said Bluetooth gateway according to the RSSI information that said wearable Bluetooth device is within the near field range.

13. The system as claimed in claim 1, wherein:
the user message further includes user information associated with personal information of the user; and
said Bluetooth gateway is configured to transmit, based on the user message, the user information to said physical fitness equipment paired with said Bluetooth gateway to enable said physical fitness equipment to display the user information.

14. The system as claimed in claim 1, wherein the physical fitness data is associated with at least one of body weight, blood pressure, a body temperature, a body fat percentage (BFP), an amount of consumed energy, a step count, a distance of movement, a lifted weight, a moving velocity, or a count of movement of the user.

15. The system as claimed in claim 14, wherein:
said physical fitness equipment includes at least one of a weight scale, a blood pressure gauge, a treadmill, an elliptical trainer, a stationary bicycle, a rowing machine or a weight lifting machine; and
said wearable Bluetooth device includes a smart wristband.

16. The system as claimed in claim 1, further comprising a wireless router configured to communicate with said Bluetooth gateway and said remote server via at least one network.

17. The system as claimed in claim 1, wherein:
said remote server is further configured to transmit a first push message to the mobile device according to a preset date, so as to remind the user to exercise; and
said wearable Bluetooth device is configured to receive the first push message from the mobile device when said wearable Bluetooth device within a communicable range of the mobile device by Bluetooth.

18. The system as claimed in claim 1, wherein:
said remote server is further configured to transmit a second push message to the mobile device according to a preset duration, so as to remind the user that elapsed time of continuous operation of said physical fitness equipment has reached the preset duration;
said wearable Bluetooth device is configured to receive the second push message from the mobile device when said wearable Bluetooth device is within a communicable range of the mobile device by Bluetooth; and
the preset duration ranges from five minutes to three hundred minutes.

19. The system as claimed in claim 1, wherein:
said physical fitness equipment is configured to store the physical fitness message for later transmitting the physical fitness message to said Bluetooth gateway when communication therewith is available, and for recording the physical fitness message when communication with said Bluetooth gateway is unavailable;
said wearable Bluetooth device is configured to store the user message for later transmitting the user message to said Bluetooth gateway when communication therewith is available, and for recording the user message when communication with said Bluetooth gateway is unavailable; and
said Bluetooth gateway is configured to store the physical fitness message and the user message for later transmitting the data packet that includes the physical fitness message and the user message thus stored to said remote server when communication therewith is available, and for recording the physical fitness message and the user message in the data packet when communication with said remote server is unavailable.

20. The system as claimed in claim 1, wherein:
the physical fitness message further includes an indication code associated with identification of said physical fitness equipment;
said remote server configured to determine, based on the identification code included in the data packet, a fixed location where said physical fitness equipment is disposed, and to determine a current location of said wearable Bluetooth device based on the fixed location.

* * * * *